Nov. 15, 1966  C. MAZIERES  3,285,053
DIFFERENTIAL THERMAL MICRO-ANALYSIS APPARATUS
Filed April 17, 1964  2 Sheets-Sheet 2

United States Patent Office 3,285,053
Patented Nov. 15, 1966

3,285,053
DIFFERENTIAL THERMAL MICRO-ANALYSIS APPARATUS
Charles Mazieres, Paris, France, assignor to Centre National de la Recherche Scientifique (French Government Administration)
Filed Apr. 17, 1964, Ser. No. 361,309
Claims priority, application France, Apr. 18, 1963, 931,921
5 Claims. (Cl. 73—15)

The present invention relates to the fields of thermal analysis and more particularly to the field of differential thermal microanalysis, in which the presence of only a small quantity of the substance to be analysed (of the order of milligrams or even micrograms) is required.

One of the principal aims of the present invention is to construct devices which will be better suited than present apparatus for the performance of such analysis and which, in particular, will permit the achievement of more accurate results and greater test sample handling ease than has been heretofore possible.

It is well known that a great interest currently exists in the application of differential thermal analysis (DTA) to the study of changes in the physical state of a substance which is subjected to a given thermal cycle (heating or cooling) or to the derivation of characteristic curves which permit the rapid determination of the nature of a mineral sample. This procedure has been used to advantage especially in the field of ceramics, glass-making, metallurgy, mineral chemistry, solid-state physics, etc.

It has already been suggested for the purpose of decreasing the thermal inertia of devices which are used for performing such analysis, to use a micro-cup which is obtained by forming a small cavity directly in the junction of a thermocouple element, this cup being intended to serve as the receptacle for the material to be analysed.

However, experience with these devices has shown that the weighing, placing and removal of test samples are very delicate operations, particularly when the samples are in the form of powder. Moreover, certain materials, e.g. arsenides, are very likely to corrode the cup. Also the cleaning of these cups after a test sample has been melted therein, sometimes presents a serious technical problem.

It is therefore an object of this invention to provide means for carrying out highly accurate differential thermal microanalysis while permitting rapid and accurate weighing, placement, and removal of the samples.

It is another object of this invention to facilitate the production of a small, accurately weighed sample in powder form for microanalysis.

It is a further object of the present invention to permit the rapid and sure placement of small test samples in powder form in the receptacles formed in thermocouple junctions.

Yet another object of the present invention is to permit small test samples to be easily removed from cavities of the type described, even after they have been melted, and to eliminate any possibility of corrosion of the cavity walls by the test sample.

The above aims are achieved in the present invention by providing a removable micro-cup for holding the test sample, the cup having a very low-specific heat and being shaped so as to fit exactly into a cavity formed in the junction of a thermocouple. By providing a sample holder which is separable from the thermocouple, one is able to avoid the difficulties described above.

These and other objects, advantages, and features of the present invention will become more readily apparent from the following description when taken together with the attached drawings, in which.

With respect to the complete apparatus for differential thermal microanalysis, it is constructed according to the thermal cycle (heating or cooling) to which one desires to subject the test sample, and one may employ, for example, the following embodiment in which it is assumed that the test sample is to be subjected to a heating cycle. In the embodiment of the complete apparatus of FIG. 1 the micro-cup unit is not shown in detail and it will be described in detail below.

Figure 1:
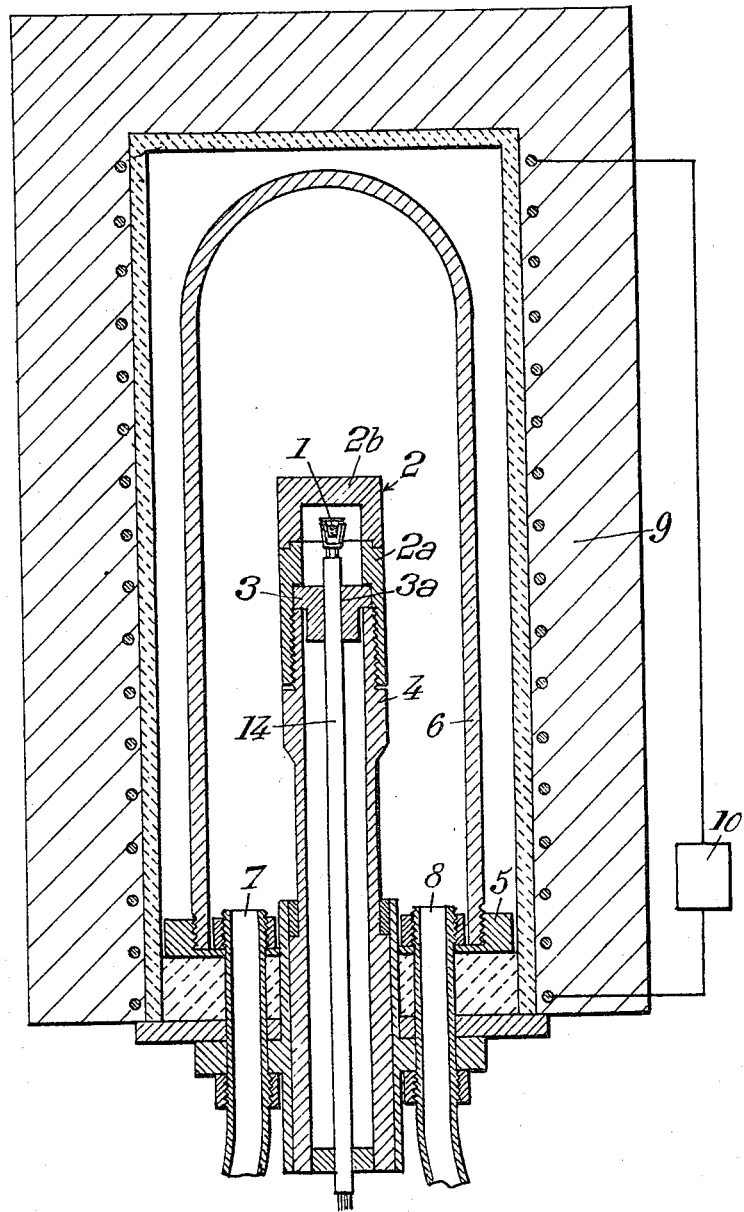
FIG. 1 shows a longitudinal cross-sectional view of a differential thermal microanalysis apparatus in which are employed the devices of the present invention.

FIG. 1 shows an apparatus in which a test sample 1 is disposed within an enclosure 2 having a small volume (several cubic centimeters) and having its walls made from a good heat conducting material, such as copper or platinum.

The enclosure 2 can be made in cylindrical form and may consist of a cylindrical element 2a, supported by a base member 3 which is in turn supported by a tubular element 4, and closed at its top by a hood member 2b. The tubular element 4 is rigidly attached to a base 5 on which is also fastened a refractory sheath 6, this sheath defining a gas-tight volume enclosing and covering the assembly of tubular element 4 and enclosure 2.

Two orifices 7 and 8 are provided in base 5 to permit communication between the exterior and the volume enclosed by sheath 6 so that a predetermined atmosphere can be introduced and maintained therein. For example, gasses which are inert with respect to the material to be analysed may be introduced under a pressure which is sufficient to drive out any ambient gasses.

Finally, an electric furnace 9, having an appropriate power source 10, is disposed around the sheath 6. The furnace and power source are designed to create, in the enclosure 2, a controllable temperature, suitable for carrying out the intended analysis on test sample 1.

Figure 2:
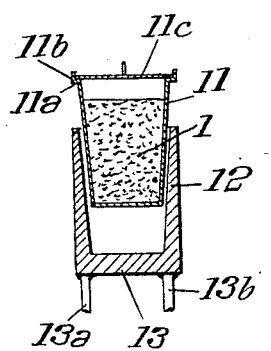
FIG. 2 shows a longitudinal cross-sectional view of a test sample holder according to the present invention.

Turning now to FIG. 2, there is shown a device for holding the test sample, which device represents a preferred embodiment of the present invention which will permit the above-described improved operation to be achieved. In this figure there is shown a micro-cup 11 which is designed to hold a test sample 1, and which is constructed so as to be easily removable from the cavity 12 formed directly in the junction of a thermocouple 13. The micro-cup is made from a substance having a low value of specific heat so that it will have only a negligible effect on the accuracy of the analysis. The thermocouple 13 also includes the two conductor wires 13a and 13b which are made from appropriately selected dissimilar metals.

It has been discovered that with the test sample 1 being placed in the micro-cup 11 before the insertion of the latter into the cavity 12, the operations of weighing the test sample and placing it in the cup, as well as the operations of emptying and cleaning the cup after a test, are made much easier than they would be if the thermocouple cavity 12, itself, constituted the test sample receiving cup.

Also, the difficulties previously caused by corrosion of the micro-cups are effectively eliminated because it involves relatively little time or expense to replace one of the removable cups of the present invention if it should become corroded.

The micro-cup of the present invention could have, as one of its embodiments, the form shown in FIG. 2 and is intended to be made from material having a high thermal conductivity, such as platinum or tantalum. The material may be made in the form of thin sheets which are shaped into a frusto-conical cup such as that shown. The dimensions for this cup may be of the order of 2 or 3 millimeters for the diameter and 2 to 4 millimeters for the height.

The cavity 12 of junction 13 is formed with the smallest tolerances possible, to conform to the outer dimensions of cup 11 so as to ensure a good correlation between the temperature of the junction and that of the test sample. The junction may be made from any suitable metal, such as platinum, or from an alloy having similar properties. The external shape of junction 13 can be given any convenient form, one example being that shown in the figure wherein the outer walls are generally parallel to the inner ones, and the conductors 13a and 13b may be soldered to the bottom surface thereof, as is also shown in the figure. It thereby results that the cavity within which the test sample is situated is formed in, and effectively enclosed by, the temperature measuring junction of the very thermocouple which is intended to measure its temperature so that very little error will exist between the temperature of the sample and the temperature indicated by the thermocouple.

In order to facilitate the handling of the micro-cup 11 its upper edge may be provided with a shoulder 11a terminated by an upwardly extending rim 11b. The cup may also be furnished with a sealing means, such as cover 11c, to prevent the loss of any of the test sample or the introduction of impurities after the sample has been prepared for analysis.

The micro-cup-thermocouple combination thus constructed may be mounted on a suitable holder, such as probe 14 and inserted in the enclosure 2 of FIG. 1, where the analysis takes place.

Figure 3:
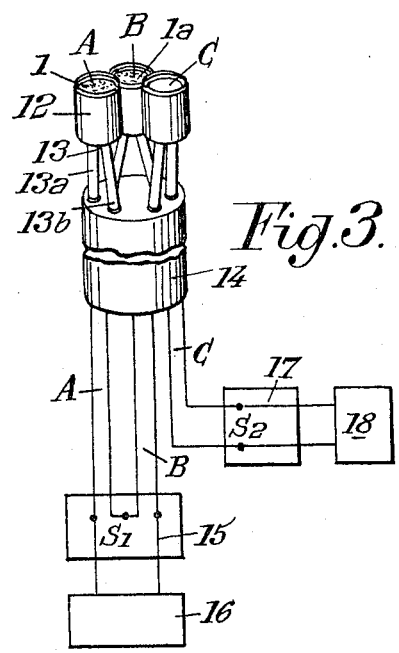
FIG. 3 shows an analysis test head supporting three holders constructed according to the present invention.

In order to take full advantage of the sensitivity of this type of test sample holder, it has been found desirable to employ three identical micro-cup-thermocouple units mounted adjacent to each other, as shown in FIG. 3. Each of the units A, B and C shown therein is identical with that shown in FIG. 2, and they are all mounted very close to each other so that they will all be as close to the same temperature as possible. The probe 14 is provided with six longitudinal bores each of which permits the passage of one of the thermocouple wires to external measuring and/or recording circuitry. The end of probe 14 having units A, B and C mounted thereon is inserted into the enclosure 2 of FIG. 1 through a circular opening 3a formed in the center of base 3. Probe 14 may be made from any suitable heat insulating material, such as porcelain or sintered aluminum.

The micro-cup of unit A is filled with the test sample so that the thermocouple of this unit serves to indicate the temperature of the sample itself. Unit B serves as the reference unit and its micro-cup is filled with some suitable reference material, which material may simply be constituted by the atmosphere existing in enclosure 2. Unit C is empty, or more precisely is filled with the atmosphere existing in the enclosure 2, and serves as the temperature measuring junction for indicating the temperature existing within enclosure 2. Although it may thus occur that both units B and C are empty, these two units differ considerably from one another from the standpoint of the function which each is to perform, the function of each depending on the manner in which it is connected to the associated indicating devices.

All of the thermocouple wires are brought to the exterior of furnace 9, through the lower end of probe 14, where they are connected to electronic measuring and/or recording devices which will provide indications of the results of the analysis.

In the particular measuring and indicating system shown in FIG. 3, test sample unit A and reference unit B are connected together in series opposition at common terminal $S_1$. This common terminal is disposed in an isothermal block 15 to prevent temperature fluctuations in the vicinity of junction $S_1$ from affecting the signals generated between the free ends of units A and B. These latter signals are applied to a galvanometer 16, which may or may not be of the recording type, where they will produce indications of the deviation of the test sample temperature from the reference temperature. Unit C is connected, by the intermediary of solder connections $S_2$ disposed in isothermal block 17, to a voltmeter 18 which will indicate the actual temperature in the vicinity of the test units. Block 17 may contain some means for maintaining the connections $S_2$ at a constant low temperature. To this end, melting ice may be placed around the connections.

While a specific embodiment of the present invention has been shown and described herein, it should be evident that many modifications might be made particularly with respect to the forms and materials used, and that this disclosure is intended to encompass any and all modifications which might normally occur to one skilled in the art, so that the scope of the present invention should be limited only by the breadth of the appended claims.

What I claim is:

1. In an apparatus for performing differential thermal microanalysis, which apparatus comprises an enclosure having a small volume within which a constant accurately determined temperature is maintained, said enclosure being disposed within a volume which is in turn surrounded by the heating elements of an electric furnace, the improvement comprising: a test sample holder associated with said apparatus, said holder comprising: a removable micro-cup into which the substance to be analyzed will be placed, said micro-cup having a low heat capacity; and a thermocouple element comprising a junction which is shaped so as to be in the form of a receptacle which mates with the outer surface of said micro-cup.

2. Apparatus as recited in claim 1 wherein said micro-cup is formed so as to have thin walls and to be in the shape of the frustum of a cone, the material for said micro-cup being chosen from the group consisting of platinum and tantalum.

3. Apparatus according to claim 1 in which said junction is made from platinum, said thermocouple further comprising a pair of wires which are soldered to the outer surface of said junction.

4. Apparatus as recited in claim 1 wherein said micro-cup has its upper edge formed in the shape of an outward extending shoulder terminated by an upward-extending rim, said micro-cup further comprising a lid.

5. Apparatus as recited in claim 3 further comprising two temperature sensitive units each of which is identical with said test sample holder; and a tubular probe having six longitudinally extending bores formed therein; said test sample holder and said two temperature sensitive units all being disposed at one end of said probe with each of said wires passing completely through a respective one of said bores.

No references cited.

RICHARD C. QUEISSER, *Primary Examiner.*